US006588477B2

(12) United States Patent
Habeck et al.

(10) Patent No.: US 6,588,477 B2
(45) Date of Patent: Jul. 8, 2003

(54) METHOD AND APPARATUS FOR CUTTING A LAMINATE MADE OF A BRITTLE MATERIAL AND A PLASTIC

(75) Inventors: Andreas Habeck, Budenheim (DE); Roland Buerkle, Mainz (DE); Torsten Otto, Heidesheim (DE); Oliver Scherer, Hennweiler (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/918,923

(22) Filed: Jul. 31, 2001

(65) Prior Publication Data

US 2002/0000292 A1 Jan. 3, 2002

Related U.S. Application Data

(62) Division of application No. 09/435,344, filed on Nov. 5, 1999.

(30) Foreign Application Priority Data

Nov. 6, 1998 (DE) .......................... 198 51 353

(51) Int. Cl.$^7$ ............... B32B 31/00; B26D 1/04
(52) U.S. Cl. ............ 156/510; 156/268; 156/257; 65/60.3; 65/105; 65/106; 65/112; 264/154; 427/289; 427/154; 83/16; 83/875; 83/881; 83/885; 428/426; 428/441; 428/442
(58) Field of Search ............. 65/60.3, 105, 106, 65/174, 112, 97; 156/257, 268, 510; 264/154; 427/289, 154; 83/16, 875, 880, 881, 885, 879; 428/426, 441, 442; 29/423, 424; 225/1, 103, 2, 96, 96.5; 451/41

(56) References Cited

U.S. PATENT DOCUMENTS 2,365,085 A * 12/1944 Joyce .................... 225/2
5,871,134 A * 2/1999 Komagata et al. ........ 225/2

* cited by examiner

Primary Examiner—Linda L Gray
(74) Attorney, Agent, or Firm—Michael J. Striker

(57) ABSTRACT

The apparatus for cutting a laminate, which is made of a brittle material and a plastic, has a cutting tool for severing the plastic along a predetermined cutting line and simultaneously scoring the brittle material; a heating device for heating the plastic along the cutting line; a device for pressing the cutting tool with an adjustable pressure on the laminate; a device for moving the engaged cutting tool along the cutting line to simultaneously sever the plastic and score the brittle material and a controller for controlling the heating device so that during the severing and scoring a temperature of the cutting tool is maintained constant and the heating is sufficient to lower viscosity of the plastic along the cutting line so that a predetermined loading pressure of the cutting tool on the laminate necessary for simultaneously scoring the brittle material and severing the plastic is not exceeded, whereby uncontrollable fracture of the brittle material does not occur.

45 Claims, 1 Drawing Sheet

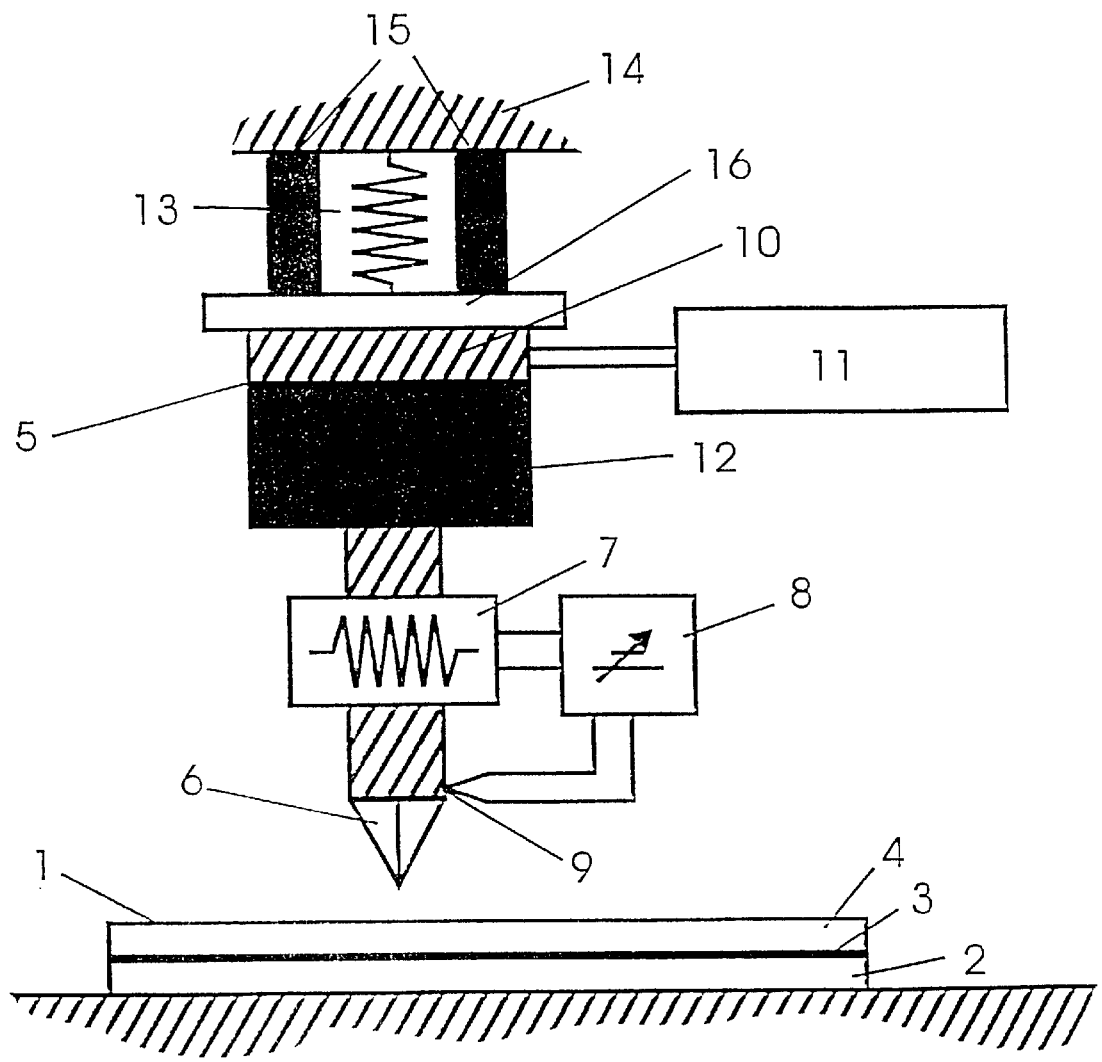

METHOD AND APPARATUS FOR CUTTING A LAMINATE MADE OF A BRITTLE MATERIAL AND A PLASTIC

RELATED APPLICATIONS

This application is a divisional of U.S. patent application Ser. No. 09/435,344 filed Nov. 5, 1999.

BACKGROUND OF THE INVENTION

1. Field of the Invention

The invention relates to a method and an apparatus for cutting a laminate made of a brittle material and a plastic with a cutting tool. The cutting of thin glass or glass-ceramic/plastic laminates is a preferred application.

2. Prior Art

Laminates made of a brittle material and a plastic are composite workpieces, the component parts of which consist of materials that differ greatly on account of their mechanical and thermal properties.

Plastics customarily used for the production of these laminates are generally mechanically relatively flexible or ductile and have a high thermal expansion of typically 20 to 80 ppm/K and a low softening temperature of typically 120 to 260° C.

In contrast to this, brittle materials, such as glass, glass-ceramic or ceramic material, used for the production of the above-mentioned laminates are mechanically brittle and generally have a low thermal expansion and a high softening temperature. The thermal expansion of glass is typically around 3.5 to 11 ppm/K and the softening temperature $T_G$ is typically 500 to 750° C.

Because of the stated very different physical properties of the two materials, until now no method or apparatus has existed for cutting a laminate comprising a brittle workpiece and a plastic with a cutting tool in one operation. The previously known methods and apparatuses relate only to the cutting of the respectively unprocessed material, but not of the composite.

To mechanically cut an unprocessed brittle material, such as glass for example, the glass surface is scored, for example by means of a diamond cutter or a small cutting wheel or a cutting blade made of hard metal. The surface damage produced in this way then represents a rupture joint of the glass, along which the crack runs in a controlled manner under tensile loading. During scoring of the glass, the normal force exerted on the cutting instrument must not exceed a certain value, dependent on the thickness of the glass. Otherwise, this generally leads to an uncontrolled rupture of the glass (H. Jebsen-Marwedel and R. Brückner (editors), Glastechnische Fabrikationsfehler [glass manufacturing defects], Springer-Verlag, Berlin, Heidelberg, New York, 1980, page 577 et seq., Chapter 12.7, F. Kerkhof and B. Gänswein, Das "Schneiden" des Glases [the "cutting" of glass]).

In addition to conventional mechanical cutting, methods in which the inducement of stresses along the cutting line is produced by thermal means have been known for some time. For example, DE 197 15 537 Al discloses a method and an apparatus for severing flat workpieces made of brittle material, in which a laser beam is used to induce a thermo-mechanical stress along a separating line.

Furthermore, cutting the unprocessed brittle material by means of sand blasting using a mask (JP 06008145 A) or by means of water-jet cutting using an abrasive agent (DE 35 33 340 Al) are known.

In contrast to this, unprocessed plastic films are generally either cut with a shear-action cut, using a shearing action of two sharp-edged hard-metal blades moved against one another, or by using a very sharp cutting knife or cutting wheel.

However, all the methods mentioned above are unsuitable for cutting a laminate of the type mentioned, for example a glass/plastic laminate. It is directly evident that the shear-action cutting of the laminate is possible only when using thin types of glass. However, here too the shear-action cut produced by the shearing action in the thin glass sheet gives rise to uncontrolled brittle cracks transversely to the cutting direction. Although a sharp, scalpel-like cutting knife is capable of severing the plastic film, it is not able to cut through or score the glass. Rather, it would very quickly be blunted on the glass surface.

When cutting with a diamond or a small hard-metal wheel, it is necessary according to the above to keep the loading pressure below a certain limit value to avoid uncontrolled rupture of the glass. The maximum loading pressure of the cutting tool limited in this way is not sufficient, however, to sever the film of the laminate composite reliably. On account of its flexibility, relatively high loading pressures (or normal forces) would be required for severing the plastic film, but for their part would again lead to uncontrolled rupture of the glass.

Because of the foregoing facts, it is not possible with the conventional mechanical cutting methods to cut these laminates in one operation. Alternative methods for cutting these composite pieces have a series of disadvantages.

In the known laser cutting, the apparatus expenditure is significantly greater, on account of the laser and the necessary optical peripherals, resulting in significantly higher costs. Vaporized or even pyrolyzed material may be deposited on the laminate or the optical components.

Water-jet cutting leads to soiling of the surface and to surface defects due to the water and the admixed abrasive agent. Cutting by means of sand blasting likewise leads to soiling of the surface and to surface defects of the laminate. These methods usually entail additional cleaning expenditure.

The introduction of these laminates, such as thin glass/plastic laminates for example, into existing product applications, for example in the display industry as a substitute for thin glass substrates, is facilitated considerably if there is an available cutting method which is as compatible as possible with the conventional cutting techniques, causes low additional costs and, if appropriate, can be implemented in existing glass cutting installations.

SUMMARY OF THE INVENTION

An object of the present invention is to provide a method and an apparatus for cutting a laminate made of a brittle material, in particular made of glass, glass-ceramic or ceramic material, and a plastic with a cutting tool, whereby the laminate is to be cut as far as possible in one operation, and at the same time a high cutting accuracy and faithfulness to contours as well as rapid cutting are to be made possible.

It is another object of the invention to design the method and the apparatus in such a way that they are compatible with existing cutting methods, that only low additional costs result and that they can, if appropriate, be implemented in existing cutting installations.

According to the invention, these objects are achieved by a method comprising the steps of:

- heating the plastic at least in the vicinity of a predetermined cutting line, thereby lowering the viscosity of the plastic,
- placing or engaging a cutting tool onto the plastic side of the laminate and adjusting the loading pressure of the cutting tool on the surface of the laminate,
- moving the cutting tool relative to the laminate along the cutting line, with severing of the plastic and simultaneous scoring of the brittle material, thereby inducing a mechanical stress, and
- additionally increasing, if appropriate, the mechanical stress along the cutting line to exceed the rupture strength of the scored brittle material.

According to the invention, these objects are also achieved by an apparatus comprising

- means for heating the plastic at least in the vicinity of a predetermined cutting line, thereby lowering the viscosity of the plastic,
- a cutting tool engageable with the plastic side of the laminate with an adjustable loading pressure of the cutting tool on the surface of the laminate,
- means for producing a relative movement between cutting tool and laminate along the cutting line, for the purpose of severing the plastic and simultaneously scoring the brittle material, thereby inducing a mechanical stress, and
- means for additionally increasing the mechanical stress along the cutting line to beyond the rupture strength of the scored brittle material, if appropriate.

The measures according to the invention make it advantageously possible to cut a laminate made of a brittle material and a plastic, in particular a laminate made of a brittle material laminated on one side with plastic, with a single cutting tool in one operation.

This is advantageous since the use of two cutting tools guided towards each other or one after the other always necessitates complicated and process-sensitive adjustment work, which is not needed in the case of the present solution.

The cutting tool must be guided on the plastic side of the laminate in order to sever the plastic reliably, and at the same time be able to score the brittle material for a brittle fracture at the cutting point To solve the fundamental problems mentioned at the beginning in the mechanical cutting of these laminates, it is necessary to lower the high loading pressure of the cutting tool for severing the plastic. By heating-up the plastic at least in the region of a predetermined cutting line, its viscosity is considerably lowered, and a small loading pressure of the cutting tool is already sufficient to sever the plastic.

The possibly required additional increase in the mechanical stress along the cutting line up to the rupture strength of the scored brittle material can be carried out, for example, by bending in the region of the score, a stress-induced crack propagation taking place along the cutting line.

To cut a laminate made of a brittle material laminated on both sides with plastic, the plastic on each side of the laminate is severed and the brittle material is scored either on one side or on two sides.

The severing of the plastic and the scoring of the brittle material may in this case be performed in a single method step with two oppositely arranged cutting tools or in two successive method steps with at least one cutting tool. For this purpose, the plastic is heated up at least in the region of the predetermined cutting line, thereby lowering the viscosity of the plastic, the heating-up taking place at least on the plastic side of the laminate on which the cutting tool is being placed at the time. The cutting tool is placed on one plastic side of the laminate, the loading pressure of the cutting tool on the surface of the laminate being adjustable. A relative movement between cutting tool and laminate is produced along the cutting line, with severing of the plastic on this side.

On the opposite plastic side of the laminate, the cutting tool or a further, additional cutting tool is placed, the loading pressure of the cutting tool on the surface of the laminate being adjustable. A relative movement between cutting tool and laminate is produced along the cutting line, with severing of the plastic and simultaneous scoring of the brittle material, thereby inducing a mechanical stress. If appropriate, the mechanical stress along the cutting line is additionally increased to beyond the rupture strength of the scored brittle material.

The cutting of the laminate made of a brittle material laminated on both sides with plastic, in which the severing of the plastic and the scoring of the brittle material is performed with two oppositely arranged cutting tools. The method according to the invention for cutting this laminate preferably includes the following method steps:

- heating-up the plastic at least in the region of the predetermined cutting line, thereby lowering the viscosity of the plastic,
- placing a respective cutting tool onto each plastic side of the laminate, the loading pressure of the respective cutting tool on the surface of the laminate being adjustable,
- producing a relative movement between the cutting is tools and the laminate along the cutting line, with severing of the plastic and simultaneous scoring of the brittle material, thereby inducing a mechanical stress, the brittle material being scored on one side or on both sides, and
- additionally increasing the mechanical stress along the cutting line to beyond the rupture strength of the scored brittle material if appropriate.

In this case, the two cutting tools are preferably arranged directly oppositely and execute a synchronized movement in relation to the laminate along the cutting line.

If the two cutting tools are arranged with a lead with respect to one another, the cutting tool which severs only the plastic on one side of the laminate is preferably arranged leading the opposite cutting tool, which severs the plastic and at the same time scores the brittle material.

The plastic is preferably heated up by radiation, in particular infrared and/or laser radiation and/or by a hot-gas jet. In this case, it is also possible for the entire laminate to be heated up.

The heating-up of the plastic may also be performed, however, by the heated cutting tool, in particular by its heated lower end. In this case, the heating-up of the plastic can be performed both by means of heat energy transfer alone, through the hot cutting tool, at least in the region of the cutting line, and also in addition to the heating-up mentioned.

The heating-up of the plastic may be performed both beyond its softening temperature and below its softening temperature, preferably just below its softening temperature.

By producing a relative movement between cutting tool and laminate, thereby moving the cutting tool and/or moving the laminate along the predetermined cutting line, the heated-up plastic is severed.

Furthermore, the surface of the brittle material can be scored by the cutting tool, and a rupture joint produced, in the same operation. Since the plastic side of the composite has then already been severed, the separating of the laminate—by a tensile stress-induced crack propagation along the rupture joint of the brittle material—is ensured. The cutting speeds which can be achieved in this case for the cutting-through of the plastic and the simultaneous scoring of the brittle material are comparable with those of conventional glass cutting.

The melted plastic film at the cutting point additionally makes it possible to dispense with the wet film, of water, glycol or propanol for example, often used in conventional glass cutting for improving the cutting quality and for increasing the edge life of the cutting tool.

A fine cut, suitable for severing the plastic and at the same time scoring the brittle material, is preferably obtained by cutting the laminate with a cutting tool having a mounted diamond tip, with a cutting wheel or with a cutting blade.

Diamond, as the hardest mineral, is ideally suited for cutting the laminate, on account of this outstanding property, mounted in the cutting tool, irrespective of whether the natural or artificially cut edges take effect.

Cutting wheels and/or cutting blades that consist of a particularly hard and tough alloy or of a ceramic, in particular of a tungsten-carbide and/or diamond-containing sintered metal, are preferably used. The cutting wheels are preferably tapered in a wedge-shaped manner and provided on the outer edge with highly polished facets.

By inducing vibration, the cutting tool, and particularly its lower end, can be made to undergo axial and possibly also transverse vibrations of low amplitude and adjustable frequency. The cutting is improved as a result. An improvement in the cutting action is not dependent on a particular frequency. However, it has been found that higher frequencies have a better effect as a result of the higher number of vibrations per unit of time. The application of ultrasound is preferred, the high frequency of which can be generated by relatively inexpensive means. Frequencies in the range above 100 kHz can be generated with the required amplitudes only with relatively great expenditure. For producing the ultrasound, a modulator is preferably used, for example an oscillator crystal, or a magnetostrictive modulator, for example a nickel rod introduced into a strong magnetic alternating field. The ultrasound produced by ultrasonic stimulation is understood to mean sound waves at frequencies higher than 16 kHz. According to the invention, sound waves at a frequency of from 20 kHz to 100 kHz and an amplitude of from 5 $\mu$m to 40 $\mu$m are preferably used. In this case, vibrations of the cutting tool executed longitudinally and/or transversely with respect to the cutting direction bring about a better material displacement of the plastic away from the rupture joint. In this way, renewed flowing together of the just severed, still soft plastic is prevented. The axial vibrations of the cutting tool lower the thrust and bearing forces required for cutting through the plastic and at the same time scoring the brittle material.

The measures according to the invention enhance the cutting quality and reduce the risk of an uncontrolled brittle fracture of the brittle material. As a result, they assist the performance of the process and improve the achievable yield in the cutting operation or make the operation possible in the first place.

The method and the apparatus are suitable with preference for cutting laminates, in particular thin laminates, made of a brittle material, for example of a glass, glass-ceramic or ceramic sheet, and of a plastic, in particular of a plastic film, it being possible for the plastic film to be a scratch-protective film, preferably a scratch-protective film of polyethylene, or of a sprayed-on polymer film.

In principle, the method and the apparatus are suitable for cutting laminates made of a brittle material and a plastic, the viscosity of which can be lowered by means of heating-up by the cutting tool. Suitable plastics are, for example, thermoplastics, and those particularly suited are, for example, polyamides, polycarbonates, polyether sulfones, olefin copolymers, polyethylene-naphthalenes, polyarylates, polypentadienes or polyethylene terephthalate (PET).

The laminates preferably have in this case a thickness of the plastic of from 1 $\mu$m to 300 $\mu$m and of the brittle material of from 10 $\mu$m to 300 $\mu$m.

The brittle material and the plastic are preferably bonded to one another by means of a layer of adhesive, the layer of adhesive preferably having a thickness of from 2 $\mu$m to 50 $\mu$m.

Alternatively, the plastic may be applied to the brittle material by extrusion, by a casting, spraying or roller-coating method or by laminating-on a plastic film.

The method and the apparatus are also suitable, however, for cutting laminates made of a relatively thick brittle material, for example of glass, in particular flat glass, glass-ceramic or ceramic material, and of a plastic, the thickness of the brittle material preferably being up to 30 mm.

Furthermore, laminates of the type mentioned in which the brittle material consists for example of silicon, germanium or carbon can also be cut.

The production of a satisfactory cut line and, in particular, of a satisfactory score path requires a particular arrangement of the cutting tool. The angle between the longitudinal axis of the cutting tool and the cutting plane in the cutting direction is preferably adjustable in the range from 55° to 75°. It is particularly preferred for the angle to be 65°.

BRIEF DESCRIPTION OF THE DRAWING

The objects, features and advantages of the invention will now be illustrated in more detail with the aid of the following description of the preferred embodiments, with reference to the accompanying sole FIGURE, which is a diagrammatic side view of one embodiment of the apparatus for cutting the laminate according to the invention.

DESCRIPTION OF THE PREFERRED EMBODIMENTS

The drawing shows a preferred apparatus for cutting a laminate 1 made of a brittle material 2 and a plastic 4 with a cutting tool 5 in one operation. The laminate 1 represented is, for example, a thin glass/plastic laminate, the glass sheet 2, which is preferably 10 $\mu$m to 300 $\mu$m thick, and the plastic film 4, which is 1 $\mu$m to 300 $\mu$m thick, preferably being bonded to one another by means of a layer of adhesive 3 which is 2 $\mu$m to 50 $\mu$m thick.

The heated cutting tool 5 can be engaged with the plastic side 4 of the glass/plastic laminate 1, the loading pressure of the cutting tool 5 on the surface of the glass/plastic laminate 1 being adjustable by suitable means, such as spring elements 13 for example. The respective loading pressure can be easily established experimentally, and generally corresponds to the loading pressure which is required for scoring the unprocessed brittle material of corresponding thickness. The lower end 6 of the heated cutting tool comprises a mounted wedge-shaped diamond, which is suitable for producing particularly fine cut lines. By means of an electrical heating element 7, the cutting tool 5, and particularly preferably its lower end 6, can be brought to the temperature necessary for cutting the respective plastic 4.

The electrical heating element 7 is preferably controlled by means of a heating-voltage device 8, automatic temperature monitoring and control taking place in a particularly preferred embodiment by means of a thermocouple 9 which is attached as close as possible to the lower end 6 of the cutting tool 5. and is connected to the heating-voltage device 8. In this way, a temperature of the cutting tool 5 necessary for cutting a particular plastic 4 can be set and controlled.

It is advantageous to keep the temperature of the cutting tool 5, or at least the temperature of its lower end 6, necessary for cutting the respective plastic 4 constant during cutting.

The respective temperature of the cutting tool 5, and in particular its lower end 6, can likewise be easily established experimentally. The softening temperature of the plastic 4 respectively to be cut, or a temperature which lies somewhat above the softening temperature, can be used as a point of reference. In this case, the temperature of the cutting tool 5, and in particular the temperature of its lower end 6, may be all the higher the higher the cutting speed, in order to permit a required heat energy transfer to the plastic 4 respectively to be cut. The viscosity of the plastic 4 should be lowered by the heating-up of the plastic 4 by the cutting tool 5 to the extent that the loading pressure necessary for the simultaneous scoring of the glass 2 is not, or scarcely, exceeded.

By means (not shown) which may preferably include a radiation source, in particular a heat source, for example an infrared and/or laser heater, or a hot-gas jet source, the plastic can, however, be additionally heated up also on its own, at least in the region of the predetermined cutting line.

In a further development of the invention, the means for heating-up are guided in such a way that a local heating-up of the plastic takes place at least along the cutting line. The means for heating-up are preferably guided together with the cutting tool and leading the latter. In this case, the said means may be used both alone for the heating-up of the plastic heating-up by the cutting tool then not being required and for the additional heating-up by the heated cutting tool.

The cutting tool 5 is connected via a suspension 14 to guide elements 15, which permit moving of the cutting tool 5 along any desired, predetermined cutting line along the glass/plastic laminate 1, it being possible for the movement to be performed both manually and by machine.

By moving the heated cutting tool 5 along the predetermined cutting line, the plastic 4, together with layer of adhesive 3, is severed and at the same time the glass 2, which lies thereunder and is bonded with the plastic 4, is scored, thereby inducing mechanical stress along the cutting line, and in the case of thin laminates is severed.

If appropriate, further increasing of the mechanical stress along the cutting line is performed by additional means (not shown) to beyond the rupture strength of the glass 2. In this way, crack propagation along the cutting line, the so-called rupturing of the glass, is achieved. In this case, the rupture is carried out, essentially by flexural tensile loading, along the scoring line with its chain of fine incipient cracks lying thereunder.

For example, at least the lower end of the cutting tool is heated up to approximately 200° C. to cut a flat glass/plastic laminate comprising a 50 $\mu$m to 400 $\mu$m thick glass sheet which is bonded with a 50 $\mu$m thick plastic film 4 made of polyethylene terephthalate (PET). In this case, a loading pressure of approximately 1 N is set for a cutting speed of approximately 10 m/min.

The invention is not restricted to the making of straight cuts; rather, curved cuts can also be accomplished.

In a preferred embodiment of the invention, the cutting tool 5, and particularly preferably its lower end 6, can be induced to undergo ultrasonic vibrations which are axial and/or transverse to the cutting tool 5 (longitudinally and/or transversely to the cutting direction), are of low amplitude, preferably an amplitude of from 5 $\mu$m to 40 $\mu$m, and of adjustable frequency, by means of a piezo- or magnetostrictive modulator 10 and a coupling element 12. The frequency of the ultrasonic vibration can be set by means of a function generator 11, good cuts having been achieved at frequencies in the range from 20 kHz to 100 kHz.

The cutting tool can preferably be set such that it can be pivoted by at least one axial element 16 perpendicularly and parallel to the cutting plane, in the cutting direction, the angle between the longitudinal axis of the cutting tool 5 and the cutting plane in the cutting direction being adjustable in the range from 55° to 75° and preferably being 65°.

The invention is also not restricted to the cutting of flat laminates; for instance, laminates deviating from the flat form, for example convex composite workpieces, e.g. plastic-coated car windscreens or mirrors, but also composite workpieces made of plastic-coated hollow glass, can also be advantageously cut.

The method according to the invention and the apparatus according to the invention are compatible with the existing mechanical glass cutting methods, and can be integrated into existing methods and apparatuses without great expenditure. The method and apparatus allow for the first time laminates made of a brittle material and a plastic to be cut with a cutting tool at high speed in one operation. Cutting accuracy and faithfulness to contours match the known methods for cutting brittle materials or unprocessed plastics.

A preferred application is the cutting of thin glass or glass-ceramic/plastic laminates, the glass or glass-ceramic preferably being 10 $\mu$m to 300 $\mu$m thick and the plastic 1 $\mu$m to 300 $\mu$m thick.

We claim:

1. An apparatus for cutting a laminate comprising a brittle material and a plastic on one side of the laminate, said apparatus comprising
    a cutting tool for severing the plastic along a predetermined cutting line on the plastic and simultaneously scoring the brittle material, thereby inducing a mechanical stress in the brittle material,
    means for controlled heating of the plastic in the vicinity of the predetermined cutting line, whereby a viscosity of the plastic is lowered in the vicinity of the predetermined cutting line,
    means for engaging the cutting tool on the plastic on the one side with an adjustable loading pressure on a surface of the laminate,
    means for moving the cutting tool relative to the laminate along the predetermined cutting line on the plastic for the purpose of severing the plastic and simultaneously scoring the brittle material, thereby inducing a mechanical stress in the brittle material, and
    means for additionally increasing the mechanical stress along the cutting line to exceed a rupture strength of the brittle material, if needed, whereby the laminate is severed along the predetermined cutting line without uncontrollable fracture of the brittle material.

2. The apparatus as defined in claim 1, further comprising means for heating the plastic on another side of the laminate in the vicinity of another predetermined cutting line when the plastic is provided on said another side as well as said one side, thereby lowering the viscosity of the plastic on said another side as well as on said one side, means for engaging another cutting tool on the plastic on the another side with an adjustable loading pressure on a surface of the plastic on the another side;

means for moving the another cutting tool along the another predetermined cutting line for the purpose of severing the plastic along the another predetermined cutting line and simultaneously scoring the brittle material on said one side or on both of said sides, thereby inducing a mechanical stress, and means for additionally increasing the mechanical stress along the predetermined cutting lines to exceed the rupture strength of the brittle material, if appropriate.

3. The apparatus as defined in claim 1, wherein the means for heating the plastic is a radiation source.

4. The apparatus as defined in claim 3, wherein the radiation source is a heat source.

5. The apparatus as defined in claim 4, wherein the heat source is an infrared heater and/or a laser heater.

6. The apparatus as defined in claim 1 or 2, wherein the means for heating the plastic is a hot-gas jet.

7. The apparatus as defined in claim 1 or 2, wherein the means for heating the plastic heats the cutting tool including a lower end of the cutting tool.

8. The apparatus as defined in claim 1 or 2, wherein the cutting tool has or cutting tools each have a lower end and a diamond cutting element is mounted in said lower end.

9. The apparatus as defined in claim 1 or 2, wherein the cutting tool has or cutting tools each have a tip and said tip comprises a cutting wheel or a cutting blade.

10. The apparatus as defined in claim 1 or 2, wherein the cutting tool has or cutting tools each have a tip and said tip comprises a cutting wheel or a cutting blade made of a hard metal or of a ceramic material.

11. The apparatus as defined in claim 1 or 2, wherein the cutting tool has or cutting tools each have a tip and said tip comprises a cutting wheel or cutting blade made of a tungsten-carbide and/or diamond-containing sintered metal.

12. The apparatus as defined in claim 1 or 2, further comprising a piezo- or magnetostrictive modulator and a coupling element coupling the modulator with the cutting tool or each of the cutting tools and wherein said modulator includes means for inducing ultrasonic vibrations in an axial, longitudinal or transverse cutting tool direction in the cutting tool or in each of the cutting tools including a lower end thereof.

13. The apparatus as defined in claim 1 or 2, further comprising a piezo- or magnetostrictive modulator and a coupling element coupling the modulator with the cutting tool or each of the cutting tools, said modulator including means for inducing ultrasonic vibrations in an axial, longitudinal or transverse cutting tool direction in the cutting tool or in each of the cutting tools including a lower end thereof, and means for controlling amplitudes and frequencies of the ultrasonic vibrations in an open-loop and closed-loop manner.

14. The apparatus as defined in claim 1 or 2, further comprising a piezo- or magnetostrictive modulator and a coupling element coupling the modulator with the cutting tool or each of the cutting tools, said modulator including means for inducing ultrasonic vibrations in an axial, longitudinal or transverse cutting tool direction in the cutting tool or in each of the cutting tools including a lower end thereof, and means for controlling amplitudes and frequencies of the ultrasonic vibrations in an open-loop and closed-loop manner; and wherein the amplitudes of the ultrasonic vibrations are from 5 µm to 40 µm and the frequencies of the ultrasonic vibrations are from 20 kHz to 100 kHz.

15. The apparatus as defined in claim 1 or 2, wherein the means for heating the plastic comprise at least one heating element for heating the cutting tool or cutting tools, a thermocouple arranged to measure a temperature of the cutting tool or tools and a heating element voltage control device.

16. The apparatus as defined in claim 1 or 2, wherein the cutting tool or each of the cutting tools is pivotable by means of at least one axial element perpendicular and parallel to a cutting plane thereof, at least in a cutting direction.

17. An apparatus for cutting a laminate to form a cut piece of the laminate, said laminate comprising a brittle material and a plastic on one side of said laminate, said apparatus comprising a cutting tool for severing the plastic along a predetermined cutting line and simultaneously scoring the brittle material, thereby inducing a mechanical stress in the brittle material;

means for heating the plastic in the vicinity of the predetermined cutting line;

means for engaging the cutting tool on the plastic on the one side of the laminate with an adjustable loading pressure acting on a surface of the plastic;

means for moving the cutting tool relative to the laminate along the predetermined cutting line in order to sever the plastic and simultaneously score the brittle material;

means for controlling the means for heating the plastic so that a temperature of the cutting tool, or at least a lower end of the cutting tool engaged with the plastic, is maintained constant during the severing of the plastic and so that, during the moving of the cutting tool and the severing of the plastic, the heating by the means for heating is sufficient to lower viscosity of the plastic along the cutting line so that a predetermined loading pressure of the cutting tool necessary for simultaneously scoring the brittle material and severing the plastic is not exceeded; and means for additionally increasing the mechanical stress in the brittle material to exceed a rupture strength of the brittle material, if necessary;

whereby the laminate is severed along the predetermined cutting line in order to form the cut piece of the laminate without uncontrollable fracture of the brittle material.

18. The apparatus as defined in claim 17, wherein said means for heating the plastic comprises an electrical heating element for heating said cutting tool or said lower end thereof, and wherein said means for controlling comprises a heating voltage supply controller for controlling a voltage applied to the electrical heating element and a thermocouple for measuring a temperature of said lower end of the cutting tool, said thermocouple being connected with the heating voltage supply controller.

19. The apparatus as defined in claim 17, wherein said means for heating is a radiation source and said radiation source is an infrared heater or a laser heater.

20. The apparatus as defined in claim 17, wherein said means for heating is a hot gas jet.

21. The apparatus as defined in claim 17, wherein said cutting tool has a diamond cutting element mounted on said lower end.

22. The apparatus as defined in claim 17, wherein said cutting tool has a cutting wheel or a cutting blade at said lower end and said cutting wheel or cutting blade is made of a hard metal or a ceramic material.

23. The apparatus as defined in claim 17, wherein said cutting tool has a cutting wheel or a cutting blade on said lower end and said cutting wheel or cutting blade is made of tungsten-carbide or diamond-containing sintered material.

24. The apparatus as defined in claim 17, further comprising a piezo- or magnetostrictive modulator and a coupling element coupling the modulator with the cutting tool, said modulator including means for inducing ultrasonic vibrations in an axial, longitudinal or transverse cutting tool direction in the cutting tool, and means for controlling amplitudes and frequencies of the ultrasonic vibrations in an open-loop and closed-loop manner.

25. The apparatus as defined in claim 24, wherein the means for inducing the ultrasonic vibrations produces said ultrasonic vibrations with amplitudes of from 5 $\mu$m to 40 $\mu$m and frequencies of from 20 kHz to 100 kHz.

26. The apparatus as defined in claim 17, wherein the cutting tool has a tip and a longitudinal axis passing through the tip of the cutting tool and further comprising means for adjusting an orientation of the cutting tool so that the longitudinal axis of the cutting tool is perpendicular to a cutting plane in which the cutting occurs, is parallel to the cutting plane or at an acute angle to the cutting plane.

27. The apparatus as defined in claim 26, wherein said acute angle is between 55° and 75°.

28. An apparatus for cutting a laminate comprising a brittle material and a plastic on one side of the laminate, said apparatus comprising means for heating of the plastic in the vicinity of a predetermined cutting line, whereby a viscosity of the plastic is lowered;

means for engaging a cutting tool on the plastic on said one side with an adjustable loading pressure of the cutting tool on a surface of the plastic;

a piezo- or magnetostrictive modulator and a coupling element for coupling the modulator with the cutting tool, said modulator includes means for inducing ultrasonic vibrations in an axial, longitudinal or transverse cutting tool direction in the cutting tool including a lower end thereof;

means for moving the cutting tool relative to the laminate along the predetermined cutting line on the plastic for the purpose of severing the plastic and simultaneously scoring the brittle material, thereby inducing a mechanical stress; and means for additionally increasing the mechanical stress along the cutting line to exceed a rupture strength of the brittle material, if needed, in order to cut the laminate along the predetermined cutting line to form a cut piece of the laminate.

29. The apparatus as defined in claim 28, wherein the means for inducing the ultrasonic vibrations produces the ultrasonic vibrations with amplitudes of from 5 $\mu$m to 40 $\mu$m and frequencies of from 20 kHz to 100 kHz.

30. The apparatus as defined in claim 28, further comprising means for controlling the means for heating of the plastic so that a temperature of the cutting tool engaged with the plastic is maintained constant during the severing of the plastic and so that during the moving of the cutting tool and the severing of the plastic the heating is sufficient to lower viscosity of the plastic along the cutting line so that a predetermined loading pressure of the cutting tool on the laminate necessary for simultaneously scoring the brittle material and severing the plastic is not exceeded.

31. The apparatus as defined in claim 30, wherein said means for heating the plastic comprises an electrical heating element for heating the cutting tool and wherein said means for controlling comprises a heating voltage supply controller for controlling a voltage applied to the electrical heating element and a thermocouple for measuring temperature of a lower end of the cutting tool, said thermocouple being connected with the heating voltage supply controller.

32. The apparatus as defined in claim 30, wherein said means for heating comprises a hot gas jet or a radiation source and wherein said radiation source is an infrared heater or a laser heater.

33. The apparatus as defined in claim 28, further comprising the cutting tool.

34. The apparatus as defined in claim 33, wherein the cutting tool comprises a cutting wheel or cutting blade, and wherein said cutting wheel or said cutting blade is made of a hard metal, a ceramic material, tungsten-carbide or diamond-containing sintered material.

35. An apparatus for cutting a laminate to form a cut piece of the laminate, said laminate comprising a brittle material and a plastic on one side of said laminate, said apparatus comprising means for controlled heating of the plastic along a predetermined cutting line to lower viscosity of the plastic and to form a softened section of heated plastic along the predetermined cutting line;

means for engaging a cutting tool on the softened section of the heated plastic with a predetermined loading pressure acting on the softened section of the heated plastic, said predetermined loading pressure being sufficient for scoring the brittle material;

means for moving the cutting tool after engagement with the heated plastic along the predetermined cutting line in order to sever the plastic and simultaneously score the brittle material; and means for additionally increasing mechanical stress along the cutting line to exceed a rupture strength of the brittle material, if needed, wherein said controlled heating and said predetermined loading pressure are such that said laminate is severed along The predetermined cutting line without uncontrollable fracture of the brittle material.

36. The apparatus as defined in claim 35, wherein said means for controlled heating of the plastic comprises an electrical heating element for heating said cutting tool, a heating voltage supply controller for controlling a voltage applied to the electrical heating element and a thermocouple for measuring a temperature of a lower end of the cutting tool, said thermocouple being connected with the heating voltage supply controller.

37. The apparatus as defined in claim 35, wherein said means for controlled heating comprises a radiation source and said radiation source is an infrared heater or a laser heater.

38. The apparatus as defined in claim 35, wherein said means for controlled heating comprises a hot gas jet.

39. The apparatus as defined 35, in wherein said culling tool has a diamond cutting element mounted on said lower end.

40. The apparatus as defined in claim 35, said cutting tool has a cutting wheel, or a cutting blade at a lower end thereof, and said cutting wheel or said cutting blade is made of a hard metal or a ceramic material.

41. The apparatus as defined in claim 35, wherein said cutting tool has a cutting wheel, or a cutting blade on a lower end thereof, and said cutting wheel or said cutting blade is made of tungsten-carbide or diamond-containing sintered material.

42. The apparatus as defined in claim 35, further comprising a piezo- or magnetostrictive modulator and a coupling element coupling the modulator with the cutting tool, said modulator including means for inducing ultrasonic vibrations in an axial, longitudinal or transverse cutting tool direction in the cutting tool, and means for controlling amplitudes and frequencies of the ultrasonic vibrations in an open-loop and closed-loop manner.

43. The apparatus as defined in claim 42, wherein the means for inducing the ultrasonic vibrations produces said ultrasonic vibrations with amplitudes of from 5 $\mu$m to 40 $\mu$m and frequencies of from 20 kHz to 100 kHz.

44. The apparatus as defined in claim 35, wherein the cutting tool has a tip and a longitudinal axis passing through the tip of the cutting tool, and further comprising means for adjusting an orientation of the cutting tool so that the longitudinal axis of the cutting tool is perpendicular to a cutting plane in which the cutting occurs, is parallel to the cutting plane or at an acute angle to the cutting plane.

45. The apparatus as defined in claim 44, wherein said acute angle is between 55° and 75°.

\* \* \* \* \*